US005727831A

United States Patent [19]

Dritlein, Jr.

[11] Patent Number: 5,727,831

[45] Date of Patent: Mar. 17, 1998

[54] CONCRETE SHOVEL AND MESH LIFTER HOOK COMBINATION

[76] Inventor: Ronald E. Dritlein, Jr., 3615 Franklin Ct., Crystal Lake, Ill. 60014

[21] Appl. No.: 763,367

[22] Filed: Dec. 13, 1996

[51] Int. Cl.[6] .......... A01B 1/20

[52] U.S. Cl. .......... 294/59; 294/51

[58] Field of Search .......... 294/2, 24, 26, 294/32, 50.6, 49, 51, 59; 7/114, 116; 172/371, 375

[56] References Cited

U.S. PATENT DOCUMENTS 3,325,835 6/1967 Burns et al. .......... 294/59 X 3,441,306 4/1969 Ramon .......... 294/59

3,767,251 10/1973 Filipo .

*Primary Examiner*—Johnny D. Cherry

*Attorney, Agent, or Firm*—Meroni & Meroni

[57] ABSTRACT

In combination, a cement shovel for shoveling sand and gravel having a metallic disk shaped shovel member with upturned side shovel edges. A blade edge of the shovel is joined at opposite ends with the upturned side shovel edges. A hook shaped member is attached to the cement shovel and positioned so as to extend lengthwise along one of the upturned side shovel edges. A hooked end extends away from the shovel blade edge for engaging concrete mesh to lift same from a bed of fresh laid concrete to lift concrete mesh to an interior level of the bed above a bottom of the bed.

9 Claims, 2 Drawing Sheets

CONCRETE SHOVEL AND MESH LIFTER HOOK COMBINATION

BACKGROUND OF THE INVENTION

1. Field of the Invention

The present invention relates to the new and improved cement shovel having a hooked shaped member attached to it which hooked shaped member is so positioned on the shovel to enable a cement worker to shovel cement and periodically use the hook shaped member to hook onto concrete mesh embedded in the cement to lift the concrete mesh to a proper position within the liquid cement as it is being poured and finished for the building of walk ways, concrete floors and other areas where beds of concrete are laid.

More specifically, the invention involves a hook on the side of a flat bottom edged shovel. When you pour concrete you pour it on a wire mesh. After the soft concrete is poured into the form at some point a concrete worker must pick up the mesh so that it is positioned somewhere between the top and the bottom layer of the soft concrete that is being poured and formed. The hook shaped member on the shovel is used to do this "pull-up" function.

2. Description of the Prior Art

In the past, it has been the practice to have a separate cement worker stand by while a cement shoveler is working the cement so that the added cement worker would then use a tool of some sort other than a shovel to reposition the concrete mesh into a desired location in a concrete bed being poured and worked. With the practices that have been followed in the past, it has generally been necessary to have two workers on jobs to shovel fresh cement and to properly position the concrete mesh therein. With my invention, the added worker can be eliminated for the cement shoveler can use his shovel with the hook shaped member to shovel as well as to properly position the concrete mesh in the freshly poured cement bed.

Before my new combination was developed, the way that concrete was laid involved the use of a regular concrete shovel so that one concrete worker would spread the concrete after it had been poured and then another concrete worker would then lift up the mesh. With my invention, a single concrete worker can perform the work of two persons when my new tool is available for use. Now the concrete shoveler/spreader can also pull-up the wire mesh into position using the hook shaped member on the shovel. Before the concrete workers union prohibited a mesh pull-up man from also spreading the concrete because of the use of different tools. Now with this invention both tasks can be done with the same tool and this in effect eliminates one job and thus is a big cost saver for the employer.

SUMMARY OF THE INVENTION

According to my present invention I have provided a new and improved combination which includes a cement shovel for shoveling sand and gravel having a metallic disk shaped shovel member with upturned side shovel edges, a blade edge of the shovel being joined at opposite ends with the upturned side shovel edges, a hook shaped member attached to the cement shovel and positioned so as to extend lengthwise along one of the upturned side shovel edges with a hooked end extending away from the blade shovel edge for engaging concrete mesh to lift same from a bed of fresh laid concrete to lift concrete mesh to an interior level of the bed above a bottom of the bed.

According to other features in the invention I have provided an elongated shank extending in side-by-side relation to the one of the shovel edges and means joining the elongated shank to the metallic disk shaped shovel member.

Another feature of my invention relates to the hooked shaped member being comprised of a metallic rod.

Yet other features relate to the metallic rod having a diameter in the range of ⅜" to ½".

DESCRIPTION OF THE DRAWINGS

Other features of my invention will become more evident from a consideration of the following detailed description of my patent drawings which disclose a single preferred embodiment, as follows.

DETAILED DESCRIPTION OF THE PREFERRED EMBODIMENT

Figure 1:
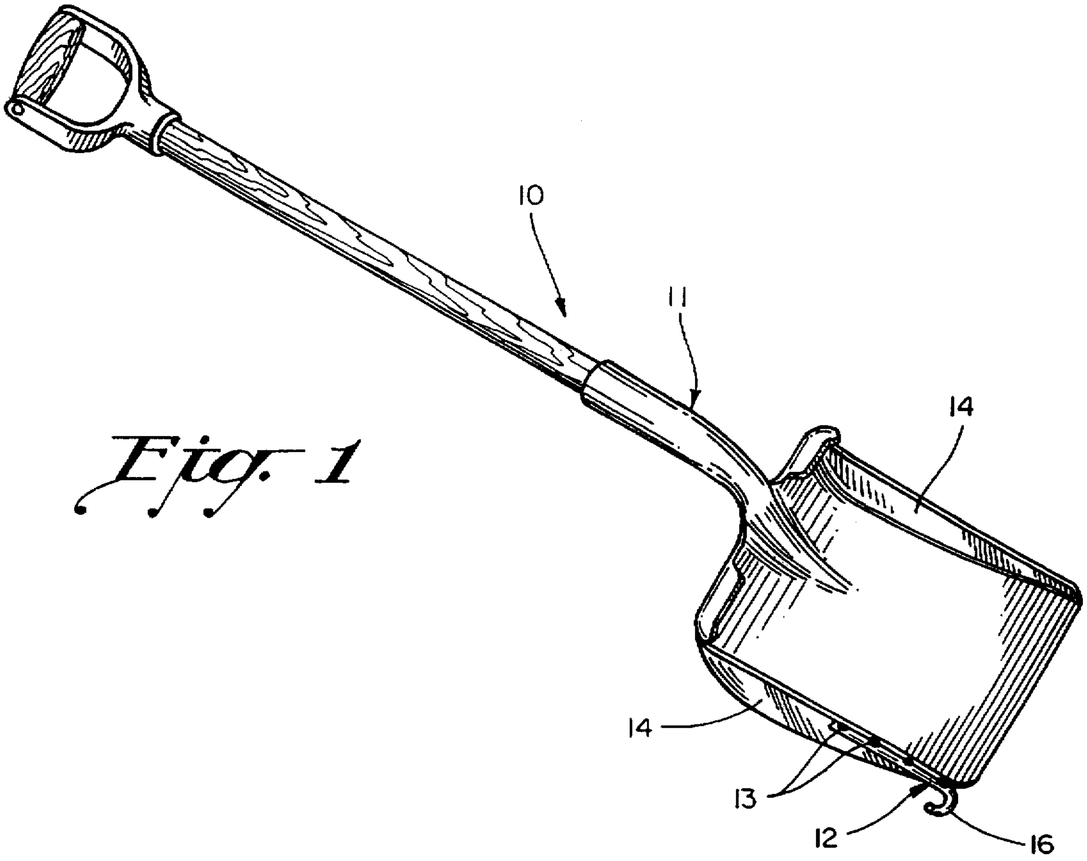
FIG. 1 is a perspective view of a concrete shovel with my hook shaped member secured thereto in accordance with important features of my invention.
Figure 2:
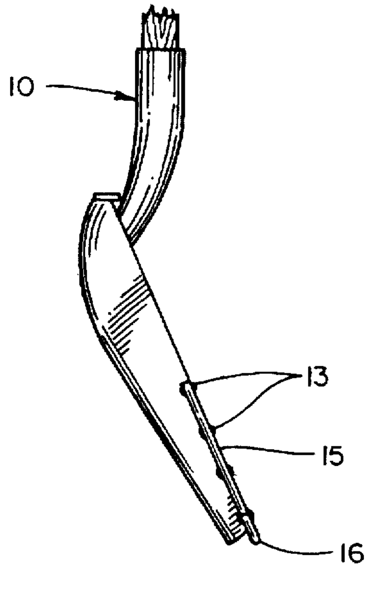
FIG. 2 is a fragmentary side view of the cement shovel shown in FIG. 1 and illustrating the hooked shaped member.
Figure 3:
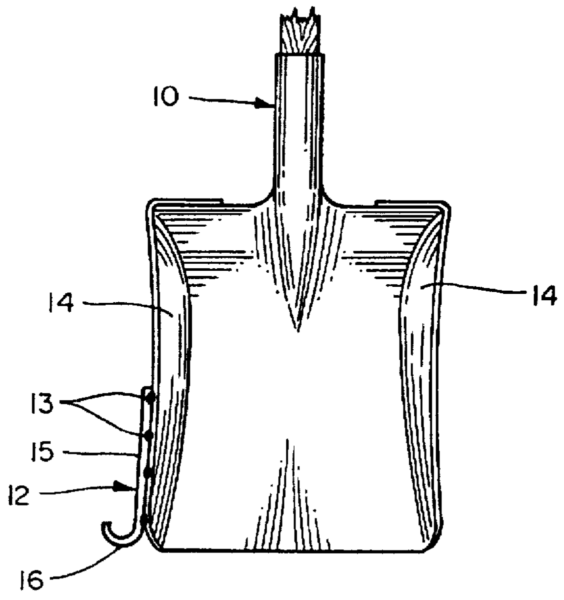
FIG. 3 is a fragmentary front view of the cement shown in FIG. 2.

Referring now to the drawings, the reference numeral 10 shown in FIG. 1 indicates generally my combination which includes a shovel 11. The shovel 11 is of a conventional construction except that a hook shaped member or J-hook 12 is attached to the shovel to create a new combination. The J-hook 12 is spot welded at 13 to one of a pair of upturned side shovel edges 14,14.

The hook shaped member 12 includes an elongated shank 15 which is spot welded at 13 to one of the upturned side shovel edges 14, as previously stated. The J-hook or hook shaped member 12 also includes a hooked end 16. The hooked end 16 extends laterally almost at right angles to the elongated shank 15 and to the associated upturned side shovel edge 14. I have found that excellent results can be obtained by the manufacture of the hook shaped member from a metallic rod which has a diameter in the range of ⅜ inch to ½ inch.

Figure 4:
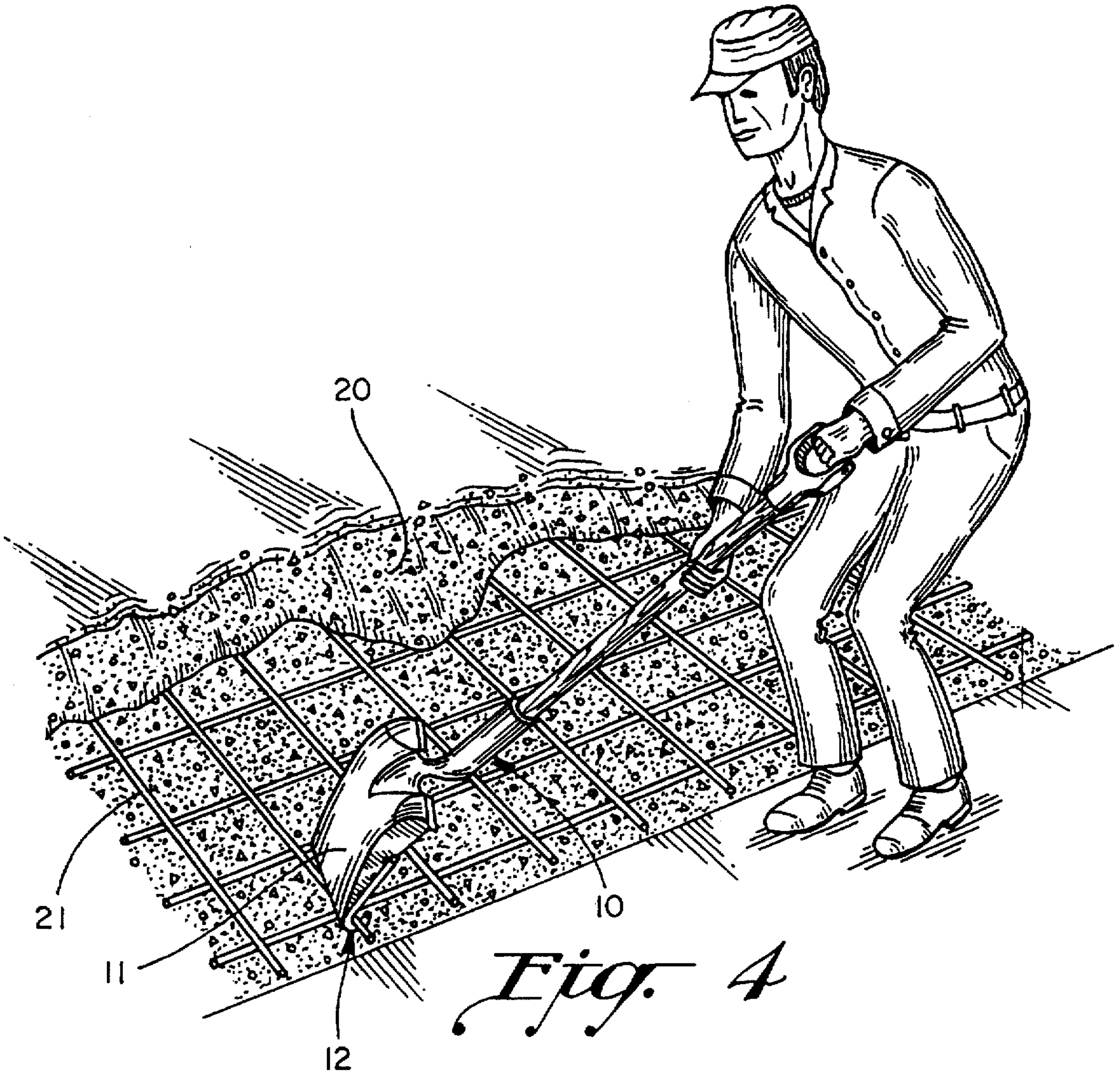
FIG. 4 is an enlarged diagrammatic view showing a cement worker using the hooked shaped member on the cement shovel to raise concrete mesh to a desired level in a bed of freshly laid cement.

In FIG. 4, it will be seen how the combination of the cement shovel 11 with the hook shaped member 12 can be used. To this end, a bed of concrete is indicated at 20 and a wire mesh 21 is shown for reinforcing the bed of concrete 20. A concrete worker is shown there using the combination 10 including shovel 11 with the hook shaped member or J-hook 12. It will be seen how the J-hook 12 can be used to lift the wire mesh 21 to a desired level in the soft bed of concrete 20 as the liquid cement is being shoveled and finished as desired.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense. Further, while the shovel is shown being held by the hands of the user as illustrated, the position of the hands can be varied such as where the person, if left handed or if right handed, might wish to hold the shovel in a modified manner, all without departing from the scope of my invention.

I claim:

1. In combination, a cement shovel for shoveling sand and gravel having a metallic disk shaped shovel member with upturned side shovel edges, a blade edge of the shovel being joined at opposite ends with said upturned side shovel edges, a hook shaped member attached to said cement shovel and positioned so as to extend lengthwise along one of said upturned side shovel edges with a hooked end extending sideways angularly away from and laterally to one side of said blade edge leaving an outer end of said hook shaped member free of overlying the shovel to be clear for the end to engage concrete mesh to lift same from a bed of freshly laid concrete to lift concrete mesh to an interior level of the bed above a bottom of the bed with a minimum change of body and shovel motion during a cement shoveling procedure.

2. The combination of claim 1, wherein said hook shaped member includes an elongated shank extending in side-by-side relation to said one of said shovel edges, and means joining said elongated shank to said metallic dish shaped shovel member.

3. The combination of claim 2, wherein said hook shaped member is comprised of a metallic rod.

4. The combination of claim 3, wherein the metallic rod has a diameter in the range of ⅜" to ½".

5. In combination, a cement shovel for shoveling sand and gravel having a metallic disk shaped shovel member with upturned side shovel edges, a blade edge of the shovel being joined at opposite ends with said upturned side shovel edges, and a metallic hook shaped member attached to said cement shovel and positioned so as to extend lengthwise along one of said upturned side shovel edges with a hooked end extending sideways angularly away from and laterally to one side of said blade edge and being positioned above said side shovel edges leaving an outer end of said hook shaped member free of overlying the shovel to be clear for the end to engage concrete mesh to lift same from a concrete bed of freshly laid concrete to lift concrete mesh to an interior level of the bed above a bottom of the bed with a minimum change of body and shovel motion during a cement shoveling procedure.

6. The combination of claim 5, wherein said hook shaped member includes a metallic elongated shank extending in side-by-side relation to said one of said shovel edges, and weld means joining said elongated shank to said metallic dish shaped shovel member.

7. The combination of claim 5, wherein said hook shaped member includes an elongated shank extending in side-by-side relation to said one of said shovel edges, and means joining said elongated shank to said metallic dish shaped shovel member, said hook shaped member is comprised of a metallic rod, and the metallic rod has a diameter in the range of ⅜" to ½".

8. In combination, a cement shovel for shoveling sand and gravel having a metallic disk shaped shovel member with upturned side shovel edges, a blade edge of the shovel being joined at opposite ends with said upturned side shovel edges, and a metallic hook shaped rod attached to one of said upturned side shovel edges of said cement shovel and positioned so as to extend lengthwise along one of said upturned side shovel edges with a hooked end of said rod bent sideways angularly away from and laterally to one side of said blade edge and being positioned above said side shovel edges leaving an outer end of said hook shaped rod free of overlying the shovel to be clear for the end to engage concrete mesh to lift same from a concrete bed of freshly laid concrete to lift concrete mesh to an interior level of the bed above a bottom of the bed with a minimum change of body and shovel motion during a cement shoveling procedure.

9. The combination of claim 8, wherein the metallic rod has a diameter in the range of ⅜" to ½".

* * * * *